US012780612B2

(12) United States Patent
Kim et al.

(10) Patent No.: US 12,780,612 B2
(45) Date of Patent: Nov. 3, 2026

(54) METHOD AND SYSTEM FOR CONTROLLING ELEVATOR

(71) Applicant: HYUNDAI ELEVATOR CO., LTD., Chungju-si (KR)

(72) Inventors: MoonSu Kim, Chungju-si (KR); DongHo Kang, Chungju-si (KR); DongHyun Kwon, Chungju-si (KR)

(73) Assignee: HYUNDAI ELEVATOR CO., LTD., Chungju-si (KR)

( * ) Notice: Subject to any disclaimer, the term of this patent is extended or adjusted under 35 U.S.C. 154(b) by 492 days.

(21) Appl. No.: 18/492,585

(22) Filed: Oct. 23, 2023

(65) Prior Publication Data

US 2024/0400349 A1 Dec. 5, 2024

(30) Foreign Application Priority Data

May 30, 2023 (KR) ........................ 10-2023-0069505
Jul. 12, 2023 (KR) ........................ 10-2023-0090516

(51) Int. Cl.
*B66B 13/14* (2006.01)
*B66B 1/06* (2006.01)
(Continued)

(52) U.S. Cl.
CPC .............. *B66B 13/146* (2013.01); *B66B 1/06* (2013.01); *B66B 1/468* (2013.01); *B66B 5/0012* (2013.01);
(Continued)

(58) Field of Classification Search
CPC ......... B66B 1/19; B66B 1/2408; B66B 1/468; B66B 1/06; B66B 1/3415; B66B 1/3461;
(Continued)

(56) References Cited

U.S. PATENT DOCUMENTS 12,032,384 B2 * 7/2024 Taira .................... G05D 1/0253
2022/0244730 A1 8/2022 Oda et al.

FOREIGN PATENT DOCUMENTS

CN 112499415 A 3/2021
CN 112537702 A 3/2021
(Continued)

OTHER PUBLICATIONS

Kamei (JP 2007137650 A), Elevator System (Year: 2007).*
(Continued)

*Primary Examiner* — Jorge L Carrasquillo
(74) *Attorney, Agent, or Firm* — Seed Intellectual Property Law Group

(57) ABSTRACT

Disclosed herein are an elevator control method and an elevator control system. The elevator control method includes the steps of: receiving a request signal from a robot; registering an elevator control signal to control operation of an elevator based on the request signal; determining whether a current situation corresponds to an exceptional situation in which operation of the elevator dictated by the elevator control signal conflicts with an actual state of the robot based on an image acquired by a camera disposed in the elevator, a location of the robot, and a situation at a platform; maintaining the currently registered elevator control signal based on determination that the current situation corresponds to the exceptional situation; and clearing the currently registered elevator control signal based on determination that the current situation corresponds to the exceptional situation.

6 Claims, 3 Drawing Sheets

(51) Int. Cl.
*B66B 1/46* (2006.01)
*B66B 5/00* (2006.01)

(52) U.S. Cl.
CPC ... *B66B 2201/104* (2013.01); *B66B 2201/232* (2013.01); *B66B 2201/405* (2013.01); *B66B 2201/4638* (2013.01)

(58) Field of Classification Search
CPC ....... B66B 5/0012; B66B 5/02; B66B 13/165; B66B 2201/104; B66B 2201/211; B66B 2201/232; B66B 2201/405; B66B 2201/4638
See application file for complete search history.

(56) References Cited

FOREIGN PATENT DOCUMENTS

| | | | |
|---|---|---|---|
| CN | 112678632 | A | 4/2021 |
| CN | 112960493 | A | 6/2021 |
| CN | 115893143 | A | 4/2023 |
| EP | 3480154 | A1 | 5/2019 |
| EP | 4296209 | A1 | 12/2023 |
| JP | 2006282329 | A | 10/2006 |
| JP | 2007137650 | A | 6/2007 |
| JP | 2011042444 | A | 3/2011 |
| JP | 2020125198 | A | 8/2020 |
| JP | 2020203754 | A | 12/2020 |
| JP | 2021066605 | A | 4/2021 |
| JP | 2023000909 | A | 1/2023 |
| KR | 2022-0139528 | A | 10/2022 |
| KR | 102516841 | B1 | 3/2023 |
| WO | WO 2020250409 | A1 | 12/2020 |

OTHER PUBLICATIONS

Fushiki (JP 2020125198 A), Elevator System (Year: 2020).*
Yonaha (JP 2011042444 A), Elevator Device Coping With Automated Guided Vehicle and Failure Detecting Method of the Elevator Device (Year: 2011).*
Hirashiki (JP 2020203754 A), Elevator, Elevator System, and Elevator Control Method (Year: 2020).*
Zhang et al. CN 116352713 A), A Robot Staggered Layer Protection Method, Device, Medium And Electronic Device (Year: 2023).*
Liu et al. (CN 110187644 A) Building Control Method, Device, Apparatus, System, And Storage Medium (Year: 2019).*
Koba et al. (WO 2020250409 A1) Elevator Link Device (Year: 2020).*

* cited by examiner

METHOD AND SYSTEM FOR CONTROLLING ELEVATOR

CROSS-REFERENCE TO RELATED APPLICATION

This patent document claims the benefit of Korean Patent Application No. 10-2023-0069505, filed on May 30, 2023, and Korean Patent Application No. 10-2023-0090516, filed on Jul. 12, 2023, the entire disclosures of which are incorporated by reference for all purposes as if fully set forth herein.

TECHNICAL FIELD

The present invention relates to an elevator control method and an elevator control system.

BACKGROUND

A robot used to provide services in a building travels to a destination floor by boarding an elevator car installed in the building. While the robot uses the elevator car, an exceptional situation may occur where operation of the elevator controlled via a robot control system conflicts with an actual state of the robot, causing damage to the robot or delay of elevator services for passengers. For example, if a door of the elevator car is closed while the robot is boarding or alighting from the elevator car, the robot can be damaged. In addition, if the door of the elevator car remains open even after the robot has boarded or alighted from the elevator car, the elevator car cannot move to a destination floor.

RELATED LITERATURE

Patent Document

Korean Patent Registration No. 10-2516841
Korean Patent Laid-open Publication No. 2022-0139528

SUMMARY

It is an object of the present invention to resolve an exceptional situation in an elevator car caused by communication between a robot control system and an elevator control system while the robot uses the elevator car.

In accordance with one aspect of the present invention, an elevator control method includes the steps of: receiving a request signal from a robot; registering an elevator control signal to control operation of an elevator based on the request signal; determining whether a current situation corresponds to an exceptional situation in which operation of the elevator dictated by the elevator control signal conflicts with an actual state of the robot based on an image acquired by a camera disposed in the elevator, a location of the robot, and a situation at a platform; maintaining the currently registered elevator control signal based on determination that the current situation corresponds to the exceptional situation; and clearing the currently registered elevator control signal based on determination that the current situation corresponds to the exceptional situation.

In one embodiment, the elevator control method may further include: registering a new elevator control signal different from the currently registered elevator control signal after the step of clearing the currently registered elevator control signal based on determination that the current situation corresponds to the exceptional situation.

In one embodiment, the currently registered elevator control signal may be a signal to assign a hall call to the elevator, and the step of determining whether a current situation corresponds to an exceptional situation in which operation of the elevator dictated by the elevator control signal conflicts with an actual state of the robot may include determining that the current situation corresponds to the exceptional situation based on determination that there is no robot that is waiting at a platform to board the elevator assigned the hall call.

In one embodiment, the currently registered elevator control signal may be a signal to maintain a door of the elevator in an open position, wherein the signal takes priority over passenger operation of a close-door button of the elevator, and the step of determining whether a current situation corresponds to an exceptional situation in which operation of the elevator dictated by the elevator control signal conflicts with an actual state of the robot may include determining that the current situation corresponds to the exceptional situation based on determination that there is no robot that is waiting for the elevator or boarding the elevator until a predetermined period of time elapses.

In one embodiment, the currently registered elevator control signal may include a signal to maintain a door of the elevator in an open position and a car call, and the step of determining whether a current situation corresponds to an exceptional situation in which operation of the elevator dictated by the elevator control signal conflicts with an actual state of the robot may include determining that the current situation corresponds to the exceptional situation based on determination that there is no robot that is waiting for the elevator, boarding the elevator, or aboard the elevator until a predetermined period of time elapses.

In one embodiment, the currently registered elevator control signal may include a signal to close a door of the elevator, and the step of determining whether a current situation corresponds to an exceptional situation in which operation of the elevator dictated by the elevator control signal conflicts with an actual state of the robot may include determining that the current situation corresponds to the exceptional situation based on determination that there is a robot that is waiting for the elevator or boarding the elevator until a predetermined period of time elapses.

In one embodiment, the currently registered elevator control signal may be a signal to maintain a door of the elevator in an open position, the step of determining whether a current situation corresponds to an exceptional situation in which operation of the elevator dictated by the elevator control signal conflicts with an actual state of the robot may include determining that the current situation corresponds to the exceptional situation based on determination that there is no robot that is alighting from the elevator or the number of robots in the elevator is equal to the number of robots anticipated to be aboard the elevator upon completion of a car call service.

In one embodiment, the currently registered elevator control signal may be a signal to close a door of the elevator, and the step of determining whether a current situation corresponds to an exceptional situation in which operation of the elevator dictated by the elevator control signal conflicts with an actual state of the robot may include determining that the current situation corresponds to the exceptional situation based on determination that there is a robot that is alighting from the elevator or the number of robots in the elevator is greater than the number of robots anticipated to be aboard the elevator upon completion of a car call service.

In accordance with another aspect of the present invention, an elevator control system includes: a memory configured to store instructions; and a processor operated in response to execution of the instructions, wherein the processor is configured to: register an elevator control signal to control operation of an elevator based on a request signal received from a robot; determine whether a current situation corresponds to an exceptional situation in which operation of the elevator dictated by the elevator control signal conflicts with an actual state of the robot based on an image acquired by a camera disposed in the elevator, a location of the robot, and a situation at a platform; maintain the currently registered elevator control signal based on determination that the current situation does not correspond to the exceptional situation; and clear the currently registered elevator control signal based on determination that the current situation corresponds to the exceptional situation.

In accordance with a further aspect of the present invention, an elevator system includes: an elevator; a camera disposed in the elevator to acquire image information comprising at least one of an image of an interior of the elevator and an image of a platform when a door of the elevator is open; a platform sensor disposed at the platform to acquire image information of the platform; and a processor configured to generate a control signal to control operation of the elevator based on a request signal received from the robot. The processor controls the elevator by determining whether a current situation corresponds to an exceptional situation in which operation of the elevator dictated by the control signal conflicts with an actual state of the robot based on the image information acquired by the camera and the image information acquired by the platform sensor.

In one embodiment, the elevator may further include a weight sensor acquiring weight information of an object abroad the elevator, and the processor may determine whether a current situation corresponds to an exceptional situation in which operation of the elevator dictated by the control signal conflicts with an actual state of the robot further based on the weight information.

According to the present invention, it is possible to improve operational efficiency of an elevator car through appropriate control of services associated with a robot depending on situations that can occur between the elevator car and the robot.

According to the present invention, it is possible to prevent a door of the elevator car from remaining open in a situation where the door needs to be closed or to prevent the door of the elevator car from being closed in a situation where the door needs to remain open.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION OF EMBODIMENTS

Figure 1:
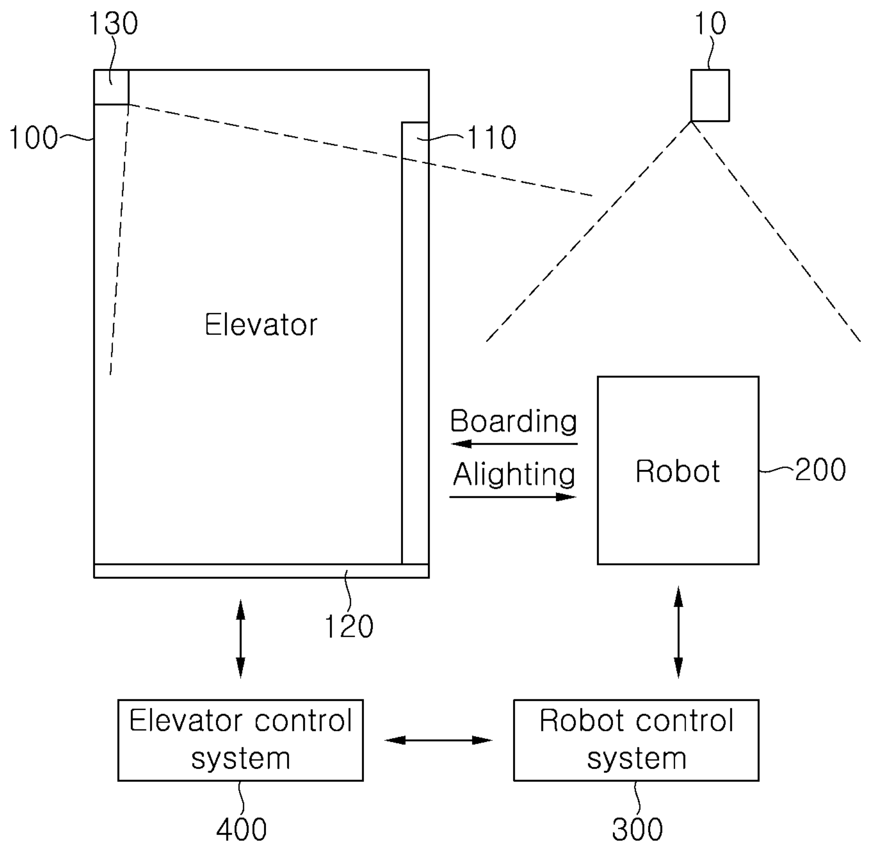
FIG. 1 is a diagram of an exemplary elevator control environment according to one embodiment of the present invention.

Hereinafter, embodiments of the present invention will be described in detail with reference to the accompanying drawings such that the present invention can be easily implemented by those skilled in the art. It should be understood that the present invention may be embodied in different ways and is not limited to the following embodiments.

In the drawings, portions irrelevant to the description will be omitted for clarity. Like components will be denoted by like reference numerals throughout the specification.

As used herein, the terms "includes", "comprises", "including" and/or "comprising" specify the presence of stated features, steps, operations, elements, and/or components, but do not preclude the presence or addition of one or more other features, steps, operations, elements, components, and/or groups.

It will be understood that the invention described in this disclosure is not intended to be limited to any particular embodiment, and includes various modifications, equivalents, and/or alternatives to the embodiments of this disclosure.

As used herein, the expression "configured to" may be used interchangeably with, for example, "suitable for", "having the capacity to", "designed to", "adapted to", "made to", or "capable of" depending on the context. The expression "configured (or set up) to" may not necessarily mean "specifically designed (hardware wise) to". Instead, in a certain context, the expression "a device configured to" may mean that the device is "capable of" doing something in conjunction with other devices or components.

It will be understood that the related literature described in this disclosure is incorporated herein by reference in its entirety and that a person having ordinary skill in the art will be able to apply what is described in the related literature to the matter briefly described herein.

FIG. 1 is a diagram of an exemplary elevator control environment according to one embodiment of the present invention.

Referring to FIG. 1, the elevator control environment includes an elevator 100, a platform sensor 10 acquiring an image of an elevator platform, a robot 200 boarding the elevator 100 to move to a destination floor, a robot control system 300 controlling the robot 200, and an elevator control system 400 controlling the elevator 100. In one embodiment, a system including the elevator 100, the platform sensor 10, and the elevator control system 400 may be referred to as an elevator system.

When a door 110 of the elevator 100 opens, the robot 200 may board the elevator 100. The elevator 100 may include a camera 130 disposed therein and a weight sensor 120 disposed on the floor thereof. The camera 130 may acquire an image of passengers and the robot 200 in the elevator 100. In addition, the camera 130 may acquire an image of the door 110 to determine whether the door 110 is open or closed. When the door 110 of the elevator 100 is open, the camera 130 may acquire an image of a platform through the open door 110. The weight sensor 120 may detect the weight of passengers and the robot 200 in the elevator 100. Images acquired by the camera 130 and weight information acquired by the weight sensor 120 may be transmitted to the elevator control system 400.

In one embodiment, the elevator control system 400 may determine the number of robots 200 in the elevator based on the images acquired by the camera 130. Since the elevator control system 400 receives a hall call or a car call from the robot 200, the elevator control system 400 may calculate the number of robots anticipated to be in the elevator upon completion of a hall call service or a car call service. For example, upon completion of the hall call service, the number of robots in the elevator should increase, whereas, upon completion of the car call service, the number of robots in the elevator should decrease as a corresponding robot alights from the elevator.

As the weight sensor 120 detects the weight of passengers and the robot 200 in the elevator 100 and transmits the detected weight information to the elevator control system 400, the elevator control system 400 may determine whether the robot 200 boards or alights from the elevator based on the information received from the weight sensor 120. The camera 130 may acquire an image of the door 110 and transmit the image to the elevator control system 400. The elevator control system 400 may determine whether the robot 200 boards or alights from the elevator based on whether the door is open or closed. The reason for this is that it is impossible for the robot to board or alight from the elevator if the door 110 is not open.

The platform sensor 10 may acquire information about the location and presence/absence of passengers and/or the robot 200 at a platform. The information acquired by the platform sensor 10 may be transmitted to the elevator control system 400.

The robot 200 is a service robot used to provide services in a building, which will be described in more detail with reference to FIG. 2. Movement of the robot 200 and/or the robot call for the elevator 100 may be performed via the robot control system 300. The robot control system 300 will be described in detail further below with reference to FIG. 3. The elevator control system 400 may be configured to control multiple elevators, including the elevator 100. For example, the elevator control system 400 may move a suitable elevator (for example, the elevator 100) among the multiple elevators to a floor on which the robot 200 is located.

In one embodiment, the robot 200 may carry at least some components of the robot control system 300. Alternatively, the robot 200 may be physically separated from the robot control system 300. For example, each of the robot 200 and the robot control system 300 may be implemented as a separate server.

In one embodiment, in order for the robot 200 to board the elevator 100, the robot 200 transmits an elevator call command signal (for example, a hall call) to the elevator control system 400 via the robot control system 140. The elevator control system 400 may assign the hall call to a most suitable elevator (for example, the elevator 100). In response to the hall call, the elevator 100 moves to a platform where the robot 200 stands by. In one embodiment, the robot 200 may transmit a destination floor registration signal along with the elevator call command signal.

When the elevator 100 arrives at the platform and the door 110 of the elevator 100 opens, the robot 200 may transmit a "robot-boarding-in-progress" signal to the elevator control system 400 via the robot control system 300 to board the elevator 100. In response to the robot-boarding-in-progress signal, the elevator control system 400 may transmit a "hold-door-open" signal to the elevator 100 to maintain the door 110 in an open position. The door 110 may be maintained in the open position until reception of a "robot-boarding-complete" signal. In one embodiment, the robot 200 may transmit the destination floor registration signal along with the robot-boarding-complete signal.

After the robot 200 finishes boarding the elevator 100, the robot 200 may transmit a robot-boarding-complete signal to the elevator control system 400 via the robot control system 300. In response to the robot-boarding-complete signal, the elevator control system 400 may transmit a "close-door" signal to the elevator 100 to move the door 110 from the open position to a closed position.

When the robot 200 finishes boarding and the door 110 is closed, the elevator 100 moves to a destination floor. The destination floor registration signal (a car call) may be transmitted to the elevator control system 400 along with the hall call. Alternatively, the robot 200 may transmit the car call to the elevator control system 400 via the robot control system 140 after the robot 200 boards the elevator 100.

When the elevator 100 arrives at the destination floor, the door 110 opens. The robot 200 may transmit a "robot-alighting-in-progress" signal to the elevator control system 400 via the robot control system 300 to alight from the elevator 100. In response to the robot-alighting-in-progress signal, the elevator control system 400 may transmit a hold-door-open signal to the elevator 100 to maintain the door 110 in the open position.

After the robot 200 finishes alighting from the elevator 100, the robot 200 may transmit a "robot-alighting-complete" signal to the elevator control system 400 via the robot control system 300. In response to the robot-alighting-complete signal, the elevator control system 400 may transmit a close-door signal to the elevator 100 to move the door 110 from the open position to the closed position.

Figure 2:
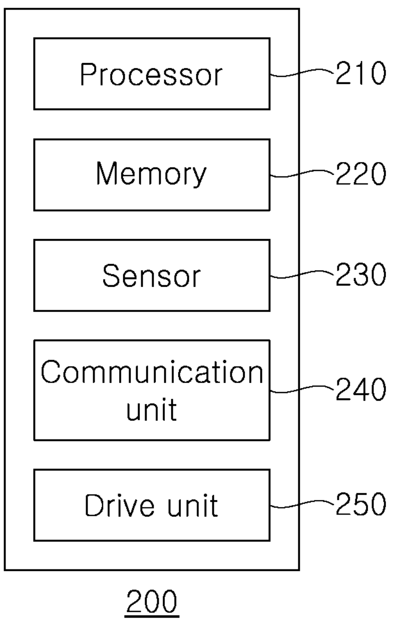
FIG. 2 is a block diagram of an elevator boarding robot according to one embodiment of the present invention.

FIG. 2 is a block diagram of the elevator boarding robot 200 according to one embodiment of the present invention.

Referring to FIG. 2, the robot 200 includes a processor 210, a memory 220, a sensor 230, a communication unit 240, and a drive unit 250. The processor 210 may be configured to control the robot 200 (for example, to move the robot and perform mapping, data processing, etc.) and the other components of the robot 200 upon execution of instructions stored in the memory 220*d*. The processor 210 may control the communication portion 240 to transmit the aforementioned signals to the elevator control system 400 via the robot control system 300. In addition, the processor 210 may control the communication portion 240 to transmit information collected by the sensor 230 or information about movement of the robot 200 (for example, boarding, alighting, waiting, etc.) to the elevator control system 400 via the robot control system 300.

The processor 210 may control the robot 200 based on information detected by the sensor 230. In one embodiment, the processor 210 may include application specific integrated circuits (ASICs), digital signal processors (DSPs), digital signal processing devices (DSPDs), programmable logic devices (PLDs), field programmable gate arrays (FPGAs), controllers, microcontrollers, microprocessors, or any other suitable processors or controllers for performing the functions described above.

The sensor 230 may be configured to collect data required for autonomous driving of the robot 200. The robot 200 detect opening/closing of the door 110 using the sensor 230 after the elevator 100 arrives at a platform or a destination floor. The robot 200 may board/alight from the elevator 100 based on detection of opening/closing of door 110. Information detected by the sensor 230 may be transmitted from the communication unit 240 to the elevator control system 400 via the robot control system 300.

The communication unit 240 may be configured to enable the robot 200 to communicate with other devices, such as the robot control system 300. The communication unit 240 may be a hardware module or software module configured to transmit/receive data and/or information, wherein the hardware module may include an antenna of the robot 100, a data bus, a network interface card, a network interface chip, a network interface port, and the like and the software module may include a network device driver, a networking program, and the like. The drive unit 250 may be configured to provide mobility to the robot 200 and may include hardware, such as a motor and wheels.

Figure 3:
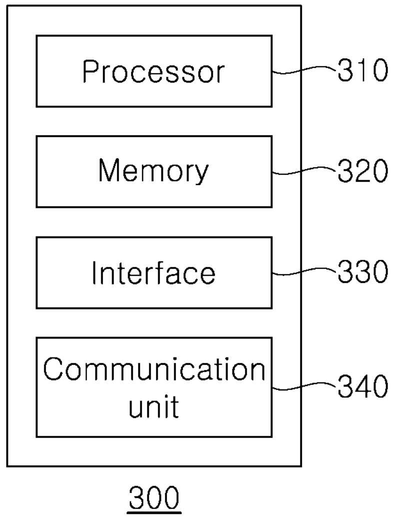
FIG. 3 is a block diagram of a robot control system according to one embodiment of the present invention.

FIG. 3 is a block diagram of the robot control system 300 according to one embodiment of the present invention. The robot control system 300 may be a device that controls movement of the robot 200 and services provided by the robot 200 in a building. The robot control system 300 may communicate with the elevator control system 400 to call the elevator 100 to move the robot 200 to a destination floor. The robot control system 300 may control the robot 200 to recognize and board the called elevator 100 and may control the robot 200 to alight from the elevator 100 at a destination floor. The robot control system 300 may include at least one computing device and may be implemented as a server located inside or outside a building. The robot control system 300 may be implemented as a cloud server (system). The robot control system 300 may be configured to transmit signals for controlling the elevator 100 to the elevator control system 400 based on signals or information received from the robot 200.

Referring to FIG. 3, the robot control system 300 may include a processor 310, a memory 320, an interface 330, and a communication unit 340. Since the processor 310, the memory 320, and the communication unit 340 may be similar in configuration to the processor 210, the memory 220, and the communication unit of the robot 200, detailed description thereof will be omitted. The interface 340 may include an input device, such as a keyboard, a mouse, a touch panel, and a microphone, and/or an output device, such as a display and a speaker.

Figure 4:
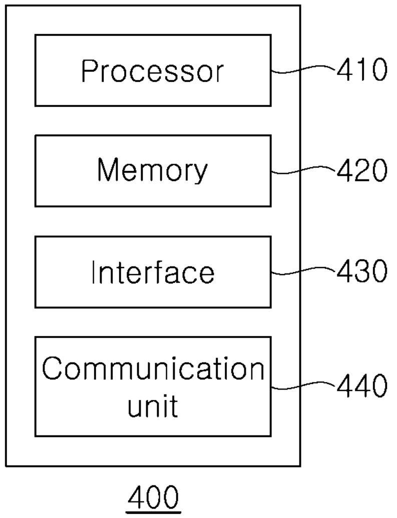
FIG. 4 is a block diagram of an elevator control system according to one embodiment of the present invention.

FIG. 4 is a block diagram of the elevator control system 400 according to one embodiment of the present invention. The elevator control system 400 400 may be a device that controls movement of the elevator 100 (or generates a signal to control movement of the elevator 100) and a call for an elevator car 20 moving (upwards/downwards) inside a building. The elevator control system 400 may include at least one computing device and may be implemented as a computer system located inside or outside a building. The elevator control system 400 may be distinct from a control panel that directly controls the elevator 100. The elevator control system 400 may transmit a signal for controlling the elevator 100 to the control panel. Alternatively, the elevator control system 400 may be configured to include the control panel. The elevator control system 400 may receive information from the platform sensor 10, the camera 130, and/or the weight sensor 120.

Referring to FIG. 4, the elevator control system 400 includes a processor 410, a memory 420, an interface 430, and a communication unit 440. Since the processor 410, the memory 420, and the interface 430 may be similar in configuration to the processor 310, the memory 320, the interface 330, and the communication unit 340, detailed description thereof will be omitted.

As described above, the elevator control system 400 may receive an elevator call command signal, a hold-door-open signal, a close-door signal, a destination floor registration signal, and the like from the robot control system 300 and may control the elevator 100 in response thereto. In one embodiment, the elevator control system 400 may receive a hall call from a passenger at a platform. The passenger may set a destination floor after boarding the elevator 100.

Referring again to FIG. 1, the camera 130 disposed inside the elevator 100 may acquire: an image of the interior of the elevator 100; and an image showing whether the door 110 is open or closed and/or an image of a platform when the door 110 is open and may transmit the images to the elevator control system 400 in real time. In addition, the elevator control system 400 may receive an image of a platform from the platform sensor 10. The elevator control system 400 may locate the robot 200 based on: the image of the interior of the elevator 100; the image showing whether the door 110 is open or closed and/or the image of a platform when the door 110 is open; and the image of a platform acquired by the platform sensor 10.

Figure 5:
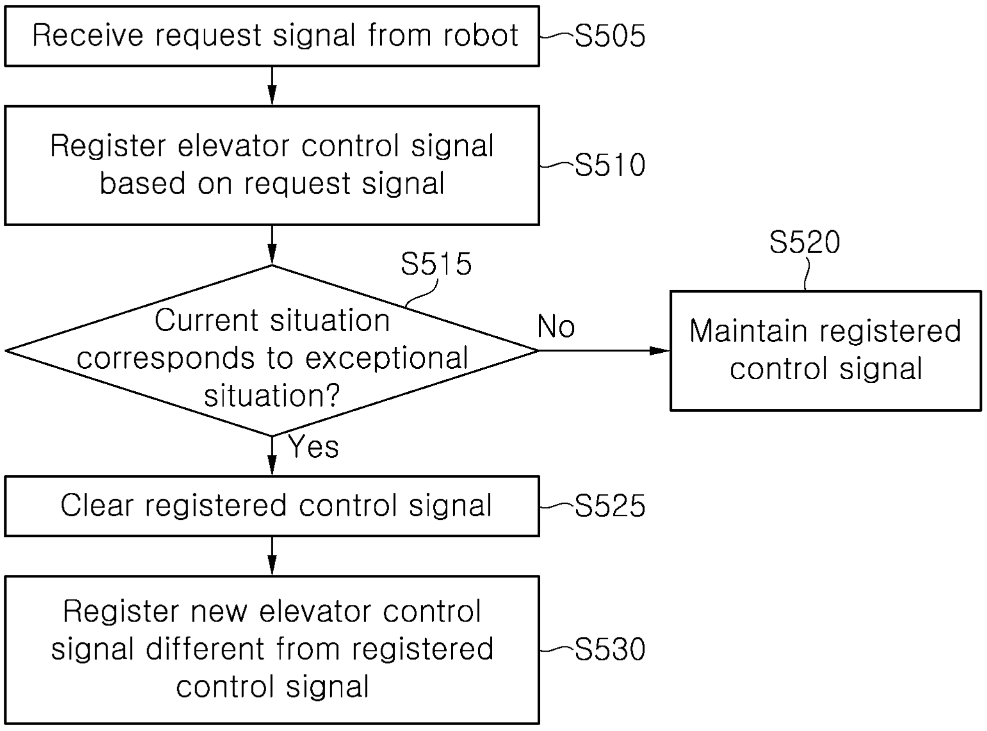
FIG. 5 is a flow diagram of an elevator control method performed by the elevator control system according to one embodiment of the present invention.

FIG. 5 is a flow diagram of an elevator control method performed by the elevator control system according to one embodiment of the present invention.

Referring to FIG. 5, the elevator control system 400 receives a request signal to control an elevator from the robot 200 (S505). The request signal may include, for example, an elevator call command signal (a hall call), a destination floor setting signal (a car call), a boarding-in-progress signal, a boarding-complete signal, an alighting-in-progress signal, an alighting-complete signal, and the like.

The elevator control system 400 registers an elevator control signal based on the request signal (S510). The elevator control signal may include a hall call, a car call, an open-door signal, a hold-door-open signal, a close-door signal, and the like.

The elevator control system 400 determines whether a current situation corresponds to an exceptional situation in which the situation of the elevator 100 and the robot 200 is different from the situation induced by the elevator control signal (S515). In one embodiment, the exceptional situation may include a case in which execution of the elevator control signal registered in step S510 can cause damage to the robot 200 or inefficient operation of the elevator 100. The exceptional situation may include a case in which operation of elevator 100 dictated by the elevator control signal registered in step S510 conflicts with an actual operational state of the robot 200. The elevator control system 400 may determine whether the current situation corresponds to the exceptional situation in which operation of the elevator dictated by the elevator control signal conflicts with the actual operational state of the robot 200 based on an image of the interior of the elevator acquired by the camera disposed inside the elevator (for example, based on the number of robots in the elevator), a location of the robot, and a situation of a platform (for example, the presence/absence of the robot standing by at the platform).

For example, the exceptional situation may include the following: 1) when there is no robot that is waiting for the elevator although the elevator control system 400 has assigned a hall call to the elevator in response to a hall call request; 2) when there is no robot that is scheduled to board the elevator (for example, when there is no robot that is waiting at a platform or passing through the elevator door or when there is no change in the number of robots in the elevator) although the elevator control system 400 has registered a hold-door-open signal in response to a robot-boarding-in progress signal; 3) when there is no robot that has requested a car call (for example, when it is not determined whether a robot corresponding to the car call is aboard the elevator or when there is no robot that has finished boarding for a predetermined period of time) although the elevator control system 400 has registered a car call in the elevator in response to a robot-boarding-complete signal; 4) when a robot has yet to finish boarding (for example, when a robot is located at a platform or is passing through the door) although the elevator control system 400 has registered a close-door signal in response to a robot-boarding-complete signal; 5) when there is no robot that is scheduled to alight from the elevator (for example, when it is not determined whether a robot alights from the elevator, when there is no robot that is passing through the elevator door, or when there is no change in the number of robots in the elevator) although the elevator control system 400 has registered a hold-door-open signal in response to a robot-alighting-in-progress signal; and 6) when there is a robot that is alighting from the elevator or waiting for alighting from the elevator although the elevator control system 400 has registered a close-door-signal in response to a robot-alighting-complete signal.

The elevator control system 400 maintains the control signal registered in step S510 based on determination that the current situation does not correspond to the exceptional situation (S520).

The elevator control system 400 clears the control signal registered in step S510 and/or registers a new control signal different from the control signal registered in step S510 to control the elevator based on determination that the current situation corresponds to the exceptional situation (S525).

The control signal registered in step S510, the exceptional situation, and the new control signal will be described in more detail further below.

Typically, in order for the robot 200 to board the elevator 100, the robot 200 transmits an elevator call command signal (for example, a hall call) to the elevator control system 400 via the robot control system 140. The elevator control system 400 may assign the hall call to a most suitable elevator (for example, the elevator 100). However, for reasons unknown, there can occur an exceptional situation in which a hall call for boarding of the robot 200 is registered with the elevator control system 400 without being canceled even when the robot 200 is not present at a platform. A hall call from the robot 200 may not be cleared even though a passenger attempts to cancel the hall call. In response to such an exceptional situation, the elevator control system 400 may cancel (clear) the hall call.

For example, the elevator control system 400 may determine that there is no robot that is waiting at the platform based on images acquired by the camera 130 or the platform sensor 110. In one embodiment, the elevator control system 400 may clear a hall call based on a determination there is no robot that is waiting at the platform until a predetermined period of time elapses after the elevator control system 400 receives a hall call or assigns the hall call to a specific elevator. In one embodiment, a start point of the predetermined period of time may be variously set. For example, the start point of the predetermined period of time may be set to when the elevator control system 400 receives a hall call, when a hall call is assigned to the elevator, when the elevator 100 arrives at the platform, when the elevator 100 arrives at the platform and the door 110 is fully open, and the like.

In one embodiment, the elevator control system 400 may manage a hall call from a passenger and a hall call from the robot 200 separately. For example, although the elevator control system 400 may clear a hall call from the robot 200, the elevator control system 400 may not clear a hall call registered by a passenger.

When the elevator 100 arrives at the platform and the door 110 of the elevator 100 opens, the robot 200 may transmit a robot-boarding-in-progress signal to the elevator control system 400 via the robot control system 300 to board the elevator 100. In response to the robot-boarding-in-progress signal, the elevator control system 400 may transmit a hold-door-open signal to the elevator 100 to maintain the door 110 in the open position. The door 110 may be maintained in the open position until the elevator control system 400 receives a robot-boarding-complete signal. Here, the door 110 is maintained in the open position even when a passenger presses a close-door button. In general, the robot 200 may transmit a robot-boarding-complete signal to the elevator control system 400 via the robot control system 300 after the robot 200 finishes boarding the elevator 100. In response to the robot-boarding-complete signal, the elevator control system 400 may transmit a close-door signal to the elevator 100 to move the door 110 from the open position to the closed position.

However, there can occur an exceptional situation in which, although the robot has finished boarding or there is no robot that is scheduled to board the elevator (for example, although there is no robot that is waiting at the platform or passing through the door 110 of the elevator 100 or the number of robots in the elevator 100 is equal to the number of robots anticipated to be aboard the elevator upon completion of a hall call service), a close-door signal is not registered with the elevator control system 400 for an unknown reason, causing the door to remain open. Here, the door can remain open even when a passenger attempts to close the door 110. In response to such an exceptional situation, the elevator control system 400 may register a close-door signal.

In one embodiment, the elevator control system 400 may determine that there is no robot that is scheduled to board the elevator or is boarding the elevator based on information acquired from at least one of the platform sensor 10, the weight sensor 120, and the camera 130 and may register a close-door signal on its own to control the door 110 of the elevator 100 to move to the closed position. For example, when there is no robot that is waiting at the platform or passing through the door 110 of the elevator 100 or when the number of robots in the elevator 100 remains equal to the number of robots anticipated to be in the elevator upon completion of a hall call service until a predetermined period of time elapses after the door 100 opens, the elevator control system 400 may register a close-door signal on its own based on determination that there is no robot that is scheduled to board the elevator or boarding the elevator.

In one embodiment, even when the elevator control system 400 registers a close-door signal to control the door 110 of the elevator 100, the door 110 of the elevator 100 may be opened or maintained in the open position in response to passenger operation of an open-door button.

In one embodiment, there can occur an exceptional situation in which, although a close-door signal has been registered with the elevator control system 400 in response to a robot-boarding-complete signal or a car call has been registered with the elevator control system 400 to control the elevator 100 to move to a destination floor, there is no robot that has requested the car call or a robot 200 corresponding to the car call is not aboard the elevator 100. In addition, there can occur an exceptional situation in which, although a car call has been registered with the elevator control system 400 to control the elevator 100 to move to a destination floor, there is no robot that is scheduled to board the elevator 100, is boarding the elevator, or has finished boarding. In response to such exceptional situations, the elevator control system 400 may clear the car call. In one embodiment, the elevator control system 400 may not clear a car call from a passenger.

In one embodiment, the elevator control system 400 may determine that a robot 200 corresponding to a registered car call is not aboard the elevator 100 based on information acquired from at least one of the platform sensor 10, the weight sensor 120, and the camera 130 and may clear the car call based thereon. For example, the elevator control system 400 may determine that a robot 200 corresponding to a registered car call is not aboard the elevator 100 based on determination that there is no robot that is waiting at the platform or boarding the elevator or the number of robots currently aboard the elevator is less than the number of robots anticipated to be aboard the elevator upon completion of a hall call service.

For a car call set to be registered along with a hall call, the elevator control system 400 may clear the registered car call (along with the hall call) based on determination that there is no robot that is waiting at the platform or boarding an assigned elevator. However, if a car call from a passenger is registered with the elevator control system 400, the car call from the passenger may not be cleared.

For a car call set to be registered after completion of boarding of the robot 200, the elevator control system 400 may determine whether the robot 200 is aboard the elevator 100 and may clear the registered car call based on, for example, a determination that the number of robots in the elevator is less than the number of robots anticipated to be aboard the elevator upon completion of a hall call service. For example, the elevator control system 400 may count the number of robots in the elevator 100 using the camera 130 and may determine, based thereon, that the number of robots in the elevator 100 is less than the number of robots anticipated to be aboard the elevator 100 upon completion of a hall call service.

After the robot 200 finishes boarding the elevator 100, the robot 200 may transmit a robot-boarding-complete signal to the elevator control system 400 via the robot control system 300. In response to the robot-boarding-complete signal, the elevator control system 400 may transmit a close-door signal to the elevator 100 to move the door 110 from the open position to the closed position.

However, there can occur an exceptional situation in which, although the close-door signal has been registered with the elevator control system 400 in response to the robot-boarding-complete signal, the robot 200 is located outside the elevator 100 or is boarding the elevator 100. In response to such an exceptional situation, the elevator control system 400 may clear the close-door signal and may register a hold-door-open signal to control the door 100 to maintain the open position. The elevator control system may determine whether the robot 200 is on standby at the platform or is boarding the elevator 100 based on information acquired from at least one of the platform sensor 10, the weight sensor 120, and the camera 130. The elevator control system 400 may register a hold-door-open signal to control the door 100 to maintain the open position based on determination that the robot 200 is on standby or is boarding the elevator 100. The elevator control system 400 may determine whether the robot 200 is boarding the elevator 100 in real time by detecting movement of the robot 200 using at least one of the platform sensor 10, the weight sensor 120, and the camera 130. The elevator control system 400 may determine that the robot 200 is on standby at a platform when the robot 200 is located at the platform.

When the elevator 100 arrives at a destination floor, the door 110 opens. The robot 200 may transmit a robot-alighting-in-progress signal to the elevator control system 400 via the robot control system 300 to alight from the elevator. In response to the robot-alighting-in-progress signal, the elevator control system 400 may transmit a hold-door-open signal to the elevator 100 to maintain the door 110 in the open position. Here, the door 110 may be maintained in the open position even when a passenger attempts to close the door 110 by pressing a close-door button. However, there can occur an exceptional situation in which a hold-door-open signal is registered with the elevator control system 400 although the robot 200 has finished alighting from the elevator or a predetermined period of time has passed without a robot that is alighting from the elevator. In response to such an exceptional situation, the elevator control system 400 may clear the hold-door-open signal and may register a close-door signal.

For example, the elevator control system 400 may determine that there is no robot that is scheduled to alight from the elevator 100 or is alighting from the elevator 100 using the camera 130 and the weight sensor 120. The elevator control system 400 may clear the hold-door-open signal and register the close-door signal based on determination that the number of robots currently aboard the elevator is equal to the number of robots anticipated to be aboard the elevator upon completion of a car call service and there is no robot that is alighting from the elevator. The elevator control system 400 may determine that there is no robot that is scheduled to alight from the elevator 100 or is alighting from the elevator 100 when the number of robots currently aboard the elevator is equal to the number of robots anticipated to be aboard the elevator upon completion of a car call service and a predetermined period of time passes without a robot that is alighting from the elevator.

In one embodiment, the elevator control system 400 may register a close-door signal in response to a robot-alighting-complete signal. However, there can occur an exceptional situation in which the robot 200 is alighting from the elevator or there is no change in the number of robots abroad the elevator. In response to such an exceptional situation, the elevator control system 400 may register a hold-door-open signal.

The elevator control system 400 may determine, in real time, whether there is a robot that is alighting from the elevator based on information received from the camera 130 or the weight sensor 120. In addition, the elevator control system 400 may determine whether the number of robots currently aboard the elevator is greater than the number of robots anticipated to be abroad the elevator upon completion of a car call service. The elevator control system 400 may clear the close-door signal and register a hold-door-open signal based on determination that there is a robot that is alighting from the elevator or the number of robots currently aboard the elevator is greater than the number of robots anticipated to be abroad the elevator upon completion of a car call service.

The methods according to the present invention may be implemented as code that can be written on a processor-readable recording medium and thus read by a processor of a server, system, equipment, computer, or integrated control unit which is used by a certain entity. The processor-readable recording medium may be any type of recording device in which data is stored in a processor-readable manner. The processor-readable recording medium may include, for example, ROM, RAM, CD-ROM, a magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

The devices and methods described above may be implemented by a hardware component, a software component, and/or a combination thereof. For example, the devices and components described in the embodiments may be implemented using one or more general-purpose computers or special-purpose computers, such as a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications executable on the operating system. The processing device may also access, store, manipulate, process, and generate data in response to execution of software. For convenience of understanding, the processing device is sometimes described as utilizing a single processing element, but a person having ordinary skill in the art will recognize that the processing device may include multiple processing elements and/or multiple types of processing elements. For example, the processing device may include multiple processors, or may include one processor and one controller. Further, another processing configuration such as a parallel processor is possible.

The software may include computer programs, code, instructions, or a combination thereof. The software may configure the processing device to operate as desired, or may independently or collectively instruct the processing device. The software and/or data may be permanently or temporarily embodied in any type of machine, component, physical device, virtual equipment, computer storage medium or device, or transmitted signal wave, for interpretation by the processing device or for providing instructions or data to the processing device. The software may also be distributed across networked computer systems to be stored or executed in a decentralized manner. The software and the data may be stored on one or more computer-readable recording media.

The embodiments of the present invention may be practiced in a distributed computing environment where certain tasks are performed by remote processing devices connected via a communication network. In the distributed computing environment, program modules may be located on both local and remote memory storage devices.

While the preferred embodiments of the present invention have been described with reference to the drawings as above, it should be understood that the foregoing embodiments are provided for illustration only and are not to be in any way construed as limiting the present invention, and that various modifications, changes, alterations, and equivalent embodiments can be made by those skilled in the art without departing from the spirit and scope of the disclosure. For example, even when the invention described herein is performed in a different order than described herein and/or the components of the described systems, structures, devices, circuits, etc. are combined or assembled in a different form than described herein or are substituted or replaced by other components or equivalents thereto, suitable results can be achieved.

Therefore, other implementations, other embodiments, and equivalents to the appended claims fall within the scope of the claims.

LIST OF REFERENCE NUMERALS

100: Elevator
200: Robot
300: Robot control system
400: Elevator control system
210, 310, 410: Processor
220, 320, 420: Memory
230: Sensor
240, 340, 440: Communication unit
250: Drive unit
330, 430: Interface

The invention claimed is:

1. An elevator control system comprising:
a memory configured to store instructions; and
a processor operated in response to execution of the instructions, the processor being configured to:
register an elevator control signal to control operation of an elevator based on a request signal received from a robot;
determine whether a current situation corresponds to an exceptional situation in which operation of the elevator dictated by the elevator control signal conflicts with an actual state of the robot based on an image acquired by a camera disposed in the elevator, a location of the robot, and a situation at a platform;
maintain the currently registered elevator control signal based on determination that the current situation does not correspond to the exceptional situation; and
clear the currently registered elevator control signal based on determination that the current situation corresponds to the exceptional situation;
wherein:
the currently registered elevator control signal is a signal to assign a hall call to the elevator; and
the step of determining whether a current situation corresponds to an exceptional situation in which operation of the elevator dictated by the elevator control signal conflicts with an actual state of the robot comprises determining that the current situation corresponds to the exceptional situation based on determination that there is no robot that is waiting at a platform to board the elevator assigned the hall call.

2. The elevator control system according to claim 1, wherein the processor is further configured to: register a new elevator control signal different from the currently registered elevator control signal after clearing the currently registered elevator control signal based on determination that the current situation corresponds to the exceptional situation.

3. An elevator control system comprising:
a memory configured to store instructions; and
a processor operated in response to execution of the instructions, the processor being configured to:
register an elevator control signal to control operation of an elevator based on a request signal received from a robot;
determine whether a current situation corresponds to an exceptional situation in which operation of the elevator dictated by the elevator control signal conflicts with an actual state of the robot based on an image acquired by a camera disposed in the elevator, a location of the robot, and a situation at a platform;

maintain the currently registered elevator control signal based on determination that the current situation does not correspond to the exceptional situation; and clear the currently registered elevator control signal based on determination that the current situation corresponds to the exceptional situation;

wherein:

the currently registered elevator control signal is a signal to maintain a door of the elevator in an open position, the signal taking priority over passenger operation of a close-door button of the elevator; and the step of determining whether a current situation corresponds to an exceptional situation in which operation of the elevator dictated by the elevator control signal conflicts with an actual state of the robot comprises determining that the current situation corresponds to the exceptional situation based on determination that there is no robot that is waiting for the elevator or boarding the elevator until a predetermined period of time elapses.

4. An elevator control system comprising:

a memory configured to store instructions; and a processor operated in response to execution of the instructions, the processor being configured to:

register an elevator control signal to control operation of an elevator based on a request signal received from a robot;

determine whether a current situation corresponds to an exceptional situation in which operation of the elevator dictated by the elevator control signal conflicts with an actual state of the robot based on an image acquired by a camera disposed in the elevator, a location of the robot, and a situation at a platform;

maintain the currently registered elevator control signal based on determination that the current situation does not correspond to the exceptional situation; and clear the currently registered elevator control signal based on determination that the current situation corresponds to the exceptional situation;

wherein:

the currently registered elevator control signal comprises a signal to close a door of the elevator; and the step of determining whether a current situation corresponds to an exceptional situation in which operation of the elevator dictated by the elevator control signal conflicts with an actual state of the robot comprises determining that the current situation corresponds to the exceptional situation based on determination that there is a robot that is waiting for the elevator or boarding the elevator until a predetermined period of time elapses.

5. An elevator control system comprising:

a memory configured to store instructions; and a processor operated in response to execution of the instructions, the processor being configured to:

register an elevator control signal to control operation of an elevator based on a request signal received from a robot;

determine whether a current situation corresponds to an exceptional situation in which operation of the elevator dictated by the elevator control signal conflicts with an actual state of the robot based on an image acquired by a camera disposed in the elevator, a location of the robot, and a situation at a platform;

maintain the currently registered elevator control signal based on determination that the current situation does not correspond to the exceptional situation; and clear the currently registered elevator control signal based on determination that the current situation corresponds to the exceptional situation;

wherein:

the currently registered elevator control signal is a signal to maintain a door of the elevator in an open position; and the step of determining whether a current situation corresponds to an exceptional situation in which operation of the elevator dictated by the elevator control signal conflicts with an actual state of the robot comprises determining that the current situation corresponds to the exceptional situation based on determination that there is no robot that is alighting from the elevator or the number of robots in the elevator is equal to the number of robots anticipated to be aboard the elevator upon completion of a car call service.

6. An elevator control system comprising:

a memory configured to store instructions; and a processor operated in response to execution of the instructions, the processor being configured to:

register an elevator control signal to control operation of an elevator based on a request signal received from a robot;

determine whether a current situation corresponds to an exceptional situation in which operation of the elevator dictated by the elevator control signal conflicts with an actual state of the robot based on an image acquired by a camera disposed in the elevator, a location of the robot, and a situation at a platform;

maintain the currently registered elevator control signal based on determination that the current situation does not correspond to the exceptional situation; and clear the currently registered elevator control signal based on determination that the current situation corresponds to the exceptional situation;

wherein:

the currently registered elevator control signal is a signal to close a door of the elevator; and the step of determining whether a current situation corresponds to an exceptional situation in which operation of the elevator dictated by the elevator control signal conflicts with an actual state of the robot comprises determining that the current situation corresponds to the exceptional situation based on determination that there is a robot that is alighting from the elevator or the number of robots in the elevator is greater than the number of robots anticipated to be aboard the elevator upon completion of a car call service.

* * * * *